United States Patent
Engerdahl

(10) Patent No.: US 8,914,950 B1
(45) Date of Patent: Dec. 23, 2014

(54) COMMUNICATION AND/OR ELECTRICAL CORD ORGANIZER AND COVER

(76) Inventor: Judy Engerdahl, Edmonton (CA)

( * ) Notice: Subject to any disclaimer, the term of this patent is extended or adjusted under 35 U.S.C. 154(b) by 295 days.

(21) Appl. No.: 13/460,910

(22) Filed: May 1, 2012

(51) Int. Cl.
*A44B 1/04* (2006.01)

(52) U.S. Cl.
USPC ....................................................... 24/122.6

(58) Field of Classification Search
CPC ............. H02G 3/04; H01B 17/58; H01B 7/18
USPC .......... 24/122.6; 138/110, 128, 156; 411/179, 411/387.5, 395, 386, 459; 248/56; 156/52, 156/55; 206/720; 16/2.3, 2.4; 174/69, 70 R, 174/71 R, 72 R, 135, 154–157, 70 C, 68.1, 174/68.3, 88 R, 136, 36, 47, 120 R, 105 R, 174/DIG. 11, 89, 91, 93
See application file for complete search history.

(56) References Cited

U.S. PATENT DOCUMENTS

| | | | |
|---|---|---|---|
| 3,080,892 A * | 3/1963 | Plummer | 138/128 |
| 3,671,675 A * | 6/1972 | Ress | 370/485 |
| 4,275,707 A * | 6/1981 | Anderson | 126/318 |
| 6,619,565 B1 * | 9/2003 | Abbott | 239/273 |
| 6,870,108 B1 * | 3/2005 | Teng | 174/100 |
| 6,940,018 B1 * | 9/2005 | Dewhirst | 174/68.1 |
| 7,119,279 B2 * | 10/2006 | Niehaus et al. | 174/72 A |
| 2002/0180202 A1 * | 12/2002 | Krauss et al. | 280/806 |
| 2010/0325891 A1 * | 12/2010 | Gerhardinger et al. | 29/897.32 |

* cited by examiner

*Primary Examiner* — Robert J Sandy
*Assistant Examiner* — Matthew Sullivan
(74) *Attorney, Agent, or Firm* — Kyle A. Fletcher, Esq.

(57) ABSTRACT

The communication and/or electrical cord organizer and cover includes a tubularly-shaped member of an undefined length, which is outfitted with a fastening means that runs along the length so as to enable opening and sealing off of the tubularly-shaped member. The organizer and cover further includes at least one connector tube that can attach itself in perpendicular orientation to any location along the tubularly-shaped member in order to provide a branching effect for ingress or egress of any electrical or communication cord with respect to the tubularly-shaped member. The connector tubes each include a serrated collar member that pierces a hole through the tubularly-shaped member, and from which threadings are provided on both the serrated collar member and the respective connector tube for securement to the tubularly-shaped member.

14 Claims, 4 Drawing Sheets

COMMUNICATION AND/OR ELECTRICAL CORD ORGANIZER AND COVER

CROSS-REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of electrical cords and communication cords, more specifically, a cover and organizer that secures and encloses a plurality of communication and/or electrical cords, and which is adaptable for individual applications of use.

B. Discussion of the Prior Art

As will be discussed immediately below, no prior art discloses a cord organizer and cover that includes a tubularly-shaped member that is used to enclose and organize a plurality of electrical cords and/or communication cords; wherein the tubularly-shaped member is of an undefined length, and includes a fastening means that runs along a length thereby enabling access to the interior; wherein the organizer includes a plurality of connector tubes that can be attached in member in order to provide a branching effect when and where needed so as to enable one or more cords to enter and exit at various locations along the tubularly-shaped member; wherein the connector tubes each includes a serrated collar member that pierces a hole through the tubularly-shaped member; wherein the serrated collar includes external threading that corresponds with internal threading of the connector tube in order to provide connection there between.

The Gossen et al. Patent (U.S. Pat. No. 3,473,278) discloses a wall trim conduit for concealing electrical wires. However, the conduit is secured against a planar surface, and is not a tubularly shaped member that has a fastening means running along a length, nor selectively used connector tubes that attach as needed to provide a branching effect where needed.

The Pollack Patent (U.S. Pat. No. 4,563,542) discloses a wall mounted holder for retaining and concealing electrical cords from electrical appliances. However, the electric cord holder assembly is affixed against a planar surface, and does not include a branching effect via connector tubes.

The Bethel Patent (U.S. Pat. No. 5,800,762) discloses a cover device for an electrical cord that is ornamental. Again, the cover is not able to include a branching effect via connector tubes, and does not include a fastening means that runs along a length of a tubularly-shaped member.

The Tate Patent (U.S. Pat. No. 7,807,928) discloses a decorative cover for an electrical cable or cord in which the cover is made form a cloth material and snaps around the cable. However, the decorative cover is not designed to organize and cover several electrical and/or communication cables for a prolonged period of time, and which includes several connector tubes that attach at needed locations to provide a branching effect.

The Holliday Patent (U.S. Pat. No. 5,732,747) discloses a cover for multiple electrical cables that looks like decorative molding for concealing the cords. Again, the cover is affixed to a rigid surface that may be planar, and is not a cover and organizer for use with at least one electrical or communication cord that includes connector tubes providing a branching effect when and where needed.

The Staskey Patent (U.S. Pat. No. Des. 445,093) illustrates a design for a decorative electrical cord cover. However, the electrical cord cover does not resemble a tubularly-shaped member having a fastening means along a length, and also does not illustrates any connector tubes.

While the above-described devices fulfill their respective and particular objects and requirements, they do not describe a cord organizer and cover that includes a tubularly-shaped member that is used to enclose and organize a plurality of electrical cords and/or communication cords; wherein the tubularly-shaped member is of an undefined length, and includes a fastening means that runs along a length thereby enabling access to the interior; wherein the organizer includes a plurality of connector tubes that can be attached in perpendicular orientation with respect to the tubularly-shaped member in order to provide a branching effect when and where needed so as to enable one or more cords to enter and exit at various locations along the tubularly-shaped member; wherein the connector tubes each includes a serrated collar member that pierces a hole through the tubularly-shaped member; wherein the serrated collar includes external threading that corresponds with internal threading of the connector tube in order to provide connection there between. In this regard, the communication and/or electrical cord organizer and cover departs from the conventional concepts and designs of the prior art.

SUMMARY OF THE INVENTION

The communication and/or electrical cord organizer and cover includes a tubularly-shaped member of an undefined length, which is outfitted with a fastening means that runs along said length so as to enable opening and sealing off of the tubularly-shaped member. The organizer and cover further includes at least one connector tube that can attach itself in perpendicular orientation to any location along the tubularly-shaped member in order to provide a branching effect for ingress or egress of any electrical or communication cord with respect to the tubularly-shaped member. The connector tubes each include a serrated collar member that pierces a hole through the tubularly-shaped member, and from which threadings are provided on both the serrated collar member and the respective connector tube for securement to the tubularly-shaped member.

An object of the invention is to provide a cord organizer and cover that can extend an undefined length, and which includes a tubularly-shaped member that is customized to include connector tubes at any desired location for producing a branching effect such that any cord can enter or exit from the tubularly-shaped member.

A further object of the invention is to provide a tubularly-shaped member that includes a fastening means along a length, which enables opening and sealing off of the interior of the tubularly-shaped member.

Another object of the invention is to provide each connector tube with a serrated collar that produces a hole in the tubularly-shaped member, which enables access in and out of the tubularly-shaped member where and when needed.

Another object of the invention is to offer different diameters of the tubularly-shaped member and/or connector tube.

A further object of the invention is to provide a connector tube and respective serrated collar that can be installed at any location on the tubularly-shaped member so as to offer a customizable cord organizer and cover.

An even further object of the invention is to provide a connector tube and serrated collar that attach to one another at the location of the hole on the tubularly-shaped member, and which will not tear at said hole via the shape and contour of the connector tube and serrated collar.

An even further object of the invention is to provide a connector tube that when installed on the tubularly-shaped member shall be in perpendicular orientation there with.

These together with additional objects, features and advantages of the communication and/or electrical cord organizer and cover will be readily apparent to those of ordinary skill in the art upon reading the following detailed description of presently preferred, but nonetheless illustrative, embodiments of the communication and/or electrical cord organizer and cover when taken in conjunction with the accompanying drawings.

In this respect, before explaining the current embodiments of the communication and/or electrical cord organizer and cover in detail, it is to be understood that the communication and/or electrical cord organizer and cover is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the communication and/or electrical cord organizer and cover.

It is therefore important that the claims be regarded as including such equivalent construction insofar as they do not depart from the spirit and scope of the communication and/or electrical cord organizer and cover. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
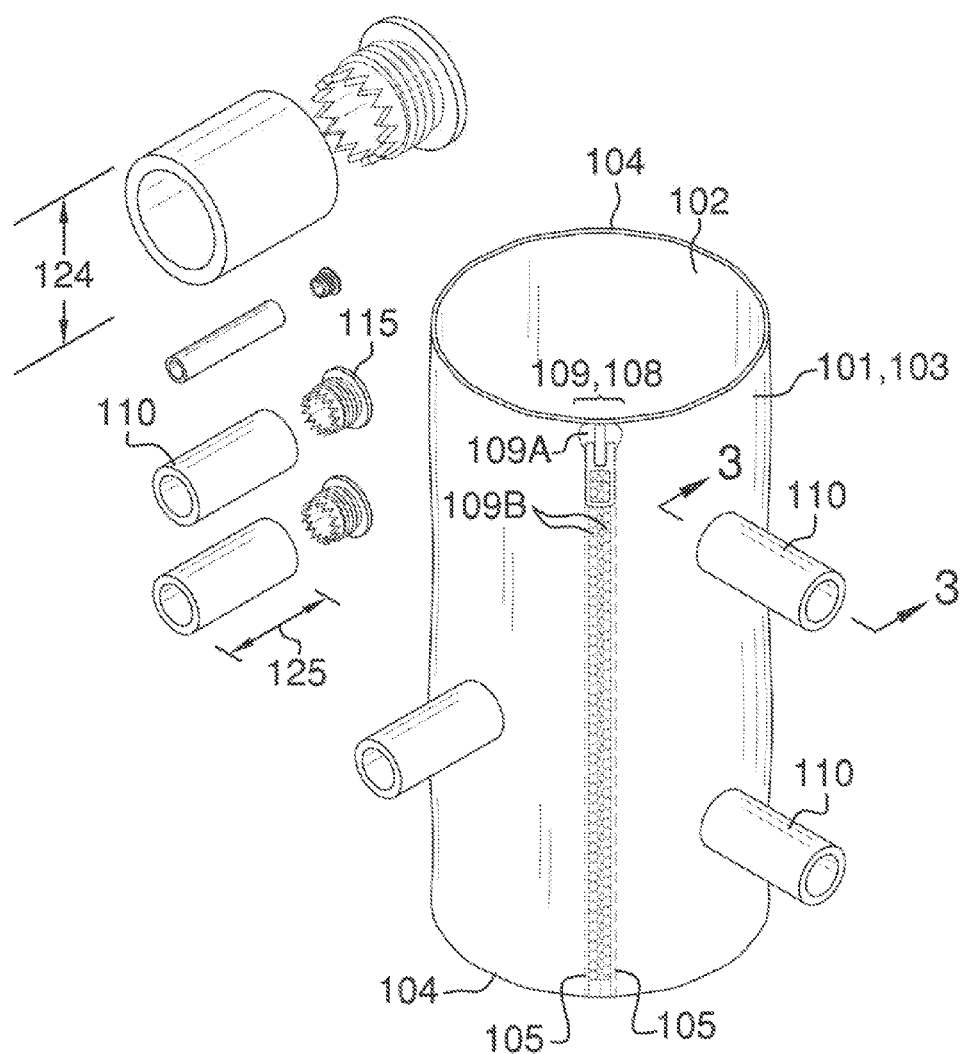
FIG. 1 illustrates a perspective view of the communication and/or electrical cord organizer and cover partially assembly and not in use, and detailing several of the connector tubes and serrated collars in an exploded fashion.
Figure 2:
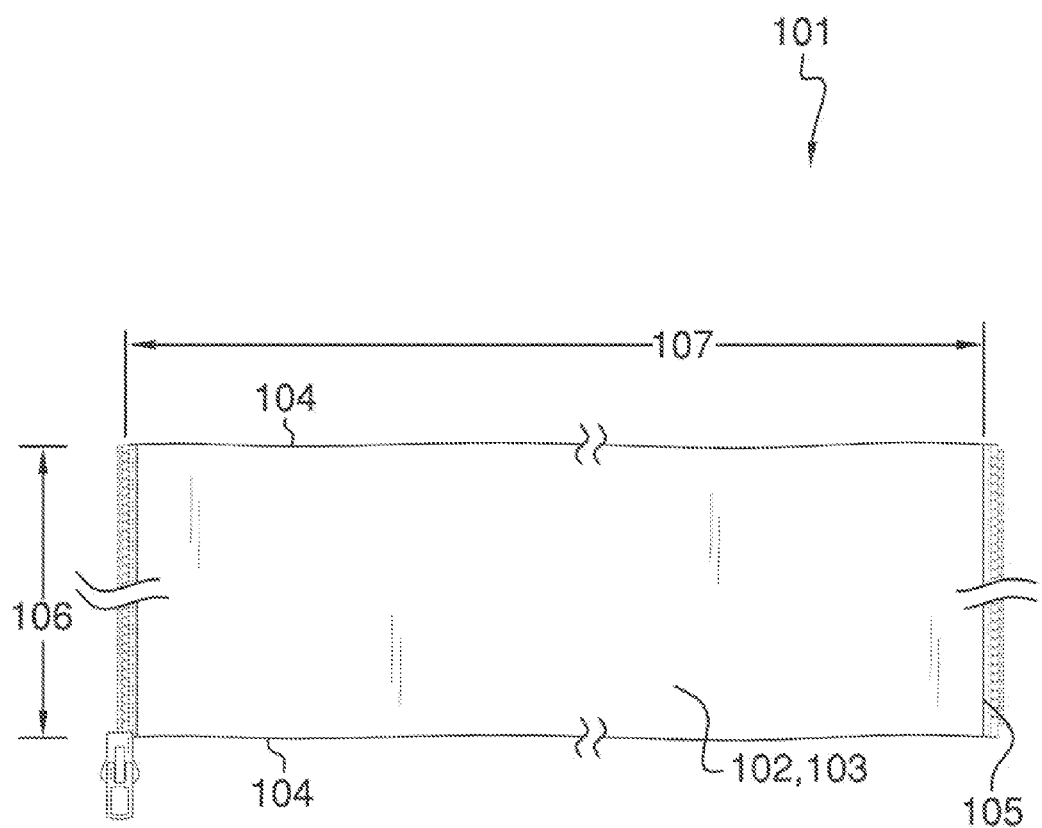
FIG. 2 illustrates a view of the tubularly-shaped member by itself and in a folded flat and unsealed state with the fastening means exposed along opposing sides.
Figure 3:
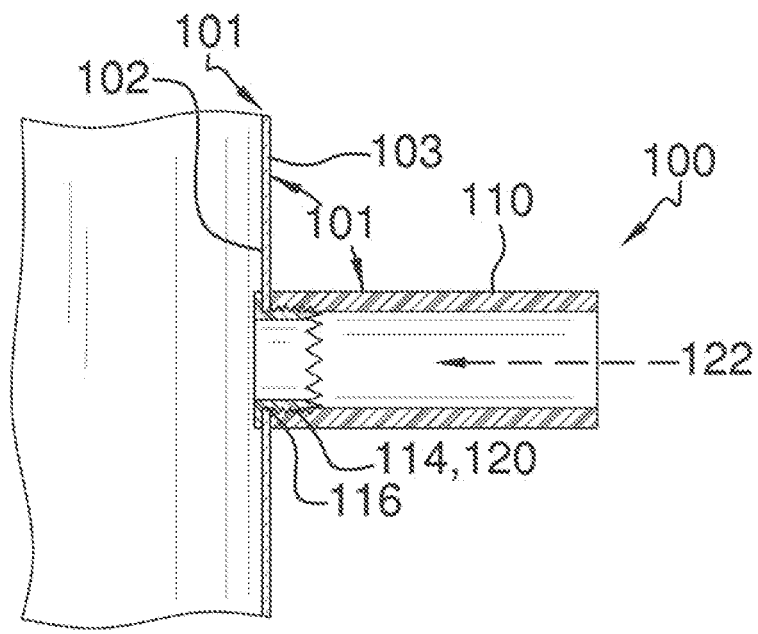
FIG. 3 illustrates a cross-sectional view of the communication and/or electrical cord organizer and cover along line 3-3 in FIG. 1, and further detailing the inter-relation of the serrated collar with respect to the connector tube, and hole located on the tubularly-shaped member.
Figure 4:
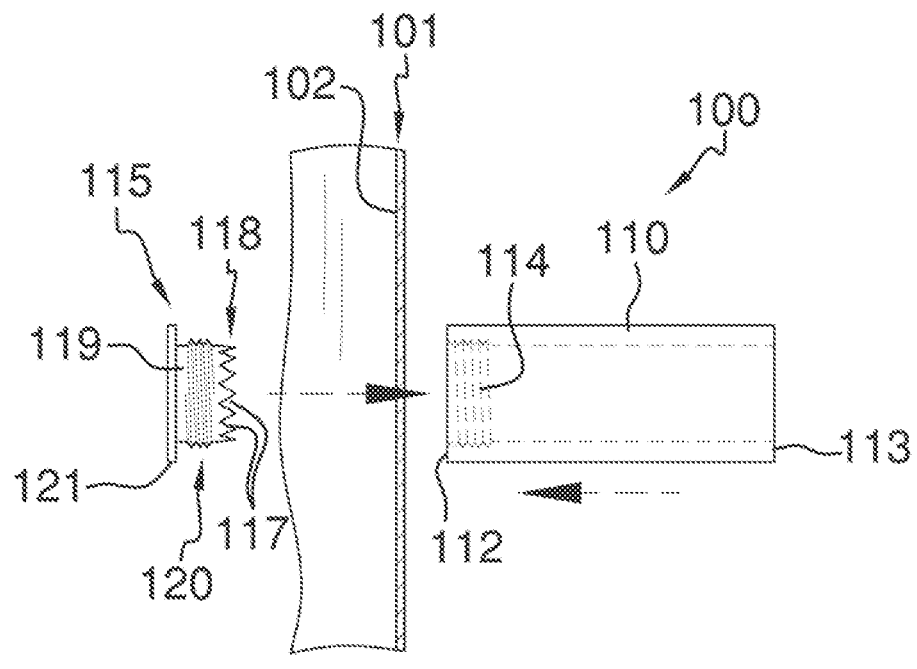
FIG. 4 illustrates an exploded view and cross-sectional view along line 3-3 in FIG. 1, and detailing the alignment of the serrated collar along an interior surface of the tubularly-shaped member and connector tube aligned along an exterior surface of the tubularly-shaped member.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-5. A communication and/or electrical cord organizer and cover 100 (hereinafter invention) includes a tubularly shaped member 101 that is further defined by an interior surface 102, an exterior surface 103, opposing distal edges 104, and opposing fastening edges 105. The tubularly-shaped member 101 when folded flat (see FIG. 2) shall be of either rectangular or square shaped. Moreover, the tubularly-shaped member 101 shall be of an undefined length 106 (note breaks along the opposing fastening edges 105) and shall be of an undefined width 107 (note breaks along the opposing distal edges 104). The tubularly-shaped member 101 is ideally constructed of a flexible material such as a plastic or fabric.

The tubularly-shaped member 101 shall include a fastening means 108 that runs along the length 106, and is provided on the opposing fastening edges 105. It shall be noted that the figures depict the fastening means 108 as a zipper 109 with a zipper pull 109A and lines of zipper teeth 109B. The fastening means 108 enables the tubularly-shaped member 101 to form a tube shape (see FIGS. 1 and 5), and convert to a flattened state prior to use. Moreover, the fastening means 108 enables connector tubes 110 to be added to the tubularly-shaped member 101.

The overall function of the invention 100 is unique in the inclusion of at least one connector tube 110. The connector tubes 110 when attached to the tubularly-shaped member 101 produce a branching effect with the invention 100. The connector tubes 110 when attached to the tubularly-shaped member 101 shall be in perpendicular orientation 111 there with (see FIG. 3). The connector tubes 110 enable different electrical or communication cords 130 (hereinafter cords) to enter and exit at different locations on the tubularly-shaped member 101.

The connector tubes 110 are each of hollowed construction and include an interface edge 112 and an external edge 113. The interface edge 112 includes internal threading 114, which shall correspond to an applicable serrated collar 115. The serrated collar 115 is important to the production of a hole 116 in the tubularly-shaped member 101, and to secure the connector tube 110 to the external surface 103 of the tubularly-shaped connector, and also to insure the perpendicular orientation 111 between the connector tube 110 and the tubularly-shaped member 101.

The serrated collar 115 includes serrations 117 along a first rim 118, which is able to cut the hole 116 in the tubularly-shaped member 101. More specifically, the serrations 117 impact the internal surface 102 of the tubularly-shaped member 101, and form the hole 116 upon cutting through the material of the tubularly-shaped member 101.

The serrated collar 115 also includes an external surface 119 that includes external threadings 120 thereon for use in connection with the internal threadings 114 of the connector tubes 110. The serrated collar 115 also includes a collar 121 that impacts the area surrounding the hole 116 along the interior surface 102 of the tubularly-shaped member 101.

The serrated collar 115 and the connector tube 110 form a channel 122 that is the essence of the branching effect. Moreover, the serrated collar 115 and the connector tube 110 enable the location of the channel 122 to be placed anywhere on the tubularly-shaped member 101 so as to customize the invention 100 where and when needed. In referring to FIG. 5, it shall be noted that the connector tubes 110 may be oriented at different angles 123 with respect to one another, and which are rotative of a central axis 124 of the invention 100.

Referring to FIG. 1, it shall be noted that the connector tubes 110 and the serrated collars 115 shall have varying diameters 121, and may include varying lengths 125. Moreover, the varying diameters 124 and lengths 125 shall accommodate cords 130 of different diameters 131 and lengths. Moreover, the cord(s) 130 may enter and exit through the opposing distal ends 104 of the tubularly-shaped member 101 or any of the connector tubes 110 and respective channels 122.

Figure 5:
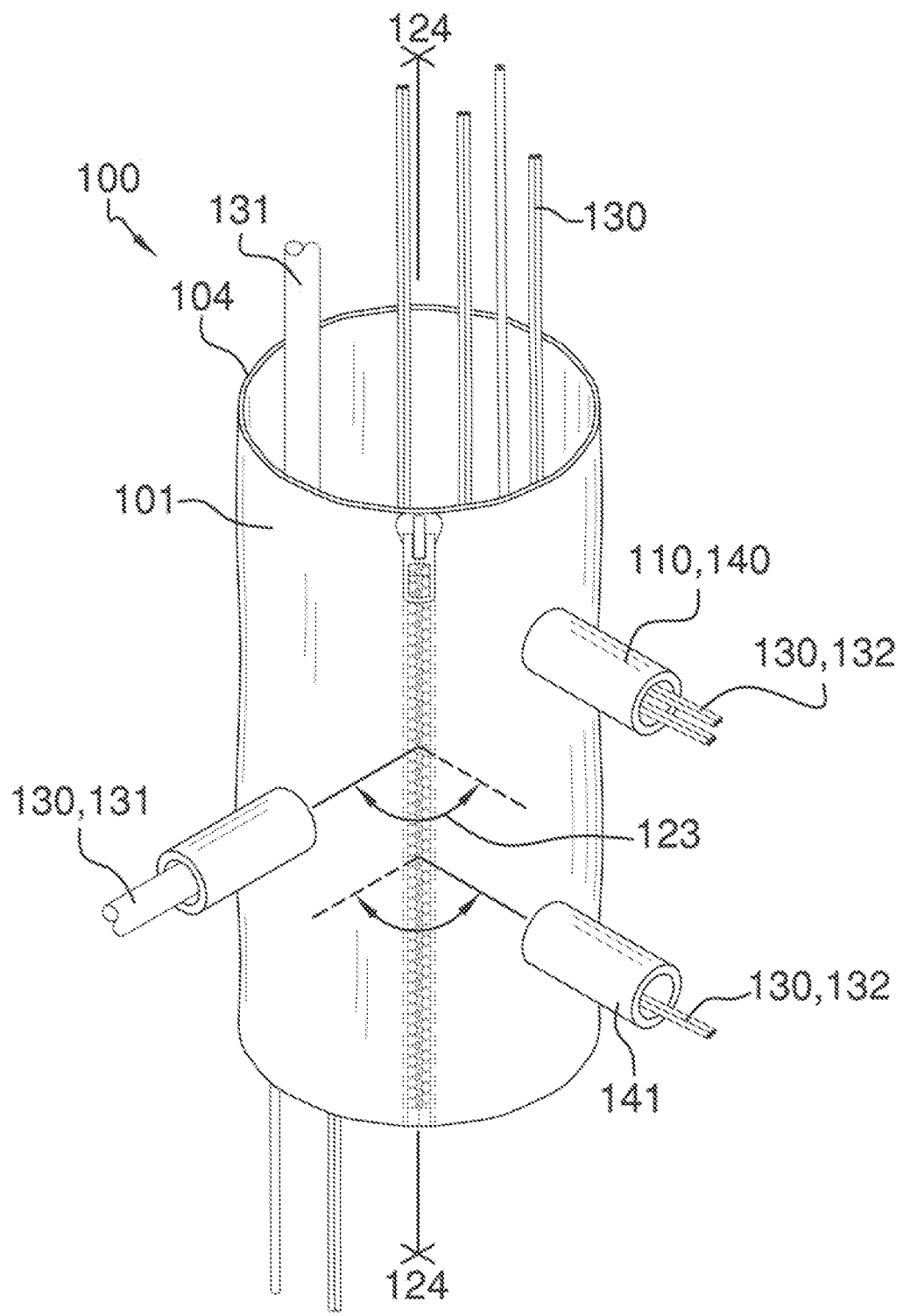
FIG. 5 illustrates a perspective view of the communication and/or electrical cord organizer and cover in use with a plurality of different cords entering and exiting at different locations with respect to the connector tubes and tubularly-shaped member.

Referring to FIG. 5, the invention 100 enables multiple combinations of use in that a first cord 131 may enter/exit at either opposing edge 104, and exit/enter one of the connector tubes 110. Moreover, a second cord 132 may enter/exit a first connector tube 140 of the connector tubes 110 and exit/enter a second connector tube 141 of the connector tubes 110.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A communication and/or electrical cord organizer and cover comprising:
    a tubularly shaped member that includes a fastening means along an undefined length, which enables the tubularly-shaped member to fold flat or form a tube shape when in use with at least one communication or electrical cord;
    wherein at least one connector tube and serrated collar affix to the tubularly-shaped member in producing a channel for said cord to electively enter or exit there through;
    wherein the tubularly-shaped member is further defined by an interior surface and an exterior surface; wherein the exterior surface is engaged with said connector tube when formed to a tube shape and in use;
    wherein the connector tube is further defined as of hollow construction inclusive of an interface edge and external edge; wherein the interface edge includes internal threading corresponsive with external threading located on an external surface of the serrated collar.

2. The communication and/or electrical cord organizer and cover as described in claim 1 wherein the tubularly-shaped member is further defined by opposing distal edges and opposing fastening edges; wherein the opposing fastening edges include fastening means thereon; wherein the opposing distal edges enable said cord to enter or exit with respect to the tubularly-shaped member.

3. The communication and/or electrical cord organizer and cover as described in claim 1 wherein the tubularly-shaped member when folded flat is either rectangular or square in shape.

4. The communication and/or electrical cord organizer and cover as described in claim 3 wherein the tubularly-shaped member has an undefined width with respect to the opposing distal edges.

5. The communication and/or electrical organizer and cover as described in claim 1 wherein the serrated collar includes serrations along a first rim, which produce said hole through the tubularly-shaped member, and prior to attachment with the connector tube.

6. The communication and/or electrical cord organizer and cover as described in claim 5 wherein the serrated collar includes a collar that rests against an interior surface of the tubularly-shaped member.

7. The communication and/or electrical cord organizer and cover as described in claim 1 wherein the serrated collar and connector tube shall have varying diameters for accommodation of varying number of cords and cord diameters.

8. A communication and/or electrical cord organizer and cover comprising:
    a tubularly shaped member that includes a fastening means along an undefined length, which enables the tubularly-shaped member to fold flat or form a tube shape when in use with at least one communication or electrical cord;
    wherein a plurality of connector tubes and corresponding number of serrated collars affix to the tubularly-shaped member in producing a channel for said cord to electively enter or exit there through;
    wherein the serrated collar and the connector tube are positioned about the tubularly-shaped member, and are oriented at different angles with respect to one another, and which are rotative of a central axis;
    wherein the tubularly-shaped member is further defined by an interior surface and an exterior surface; wherein the exterior surface is engaged with said connector tube when formed to a tube shape and in use;
    wherein the connector tube is further defined as of hollow construction inclusive of an interface edge and external edge; wherein the interface edge includes internal threading corresponsive with external threading located on an external surface of the serrated collar.

9. The communication and/or electrical cord organizer and cover as described in claim 8 wherein the tubularly-shaped member is further defined by opposing distal edges and opposing fastening edges; wherein the opposing fastening edges include fastening means thereon wherein the opposing distal edges enable said cord to enter or exit with respect to the tubularly-shaped member.

10. The communication and/or electrical cord organizer and cover as described in claim 8 wherein the tubularly-shaped member when folded flat is either rectangular or square in shape.

11. The communication and/or electrical cord organizer and cover as described in claim 10 wherein the tubularly-shaped member has an undefined width with respect to the opposing distal edges.

12. The communication and/or electrical cord organizer and cover as described in claim 8 wherein the serrated collar includes serrations along a first rim, which produce said hole through the tubularly-shaped member, and prior to attachment with the connector tube.

13. The communication and/or electrical cord organizer and cover as described in claim 12 wherein the serrated collar includes a collar that rests against an interior surface of the tubularly-shaped member.

14. The communication and/or electrical cord organizer and cover as described in claim 8 wherein the serrated collar and connector tube shall have a same diameter with respect to one another, and which may have varying diameters for accommodation of varying number of cords and cord diameters.

* * * * *